Nov. 21, 1967  W. J. HALL  3,353,667
SLIDE TRAY
Original Filed March 1, 1963  5 Sheets-Sheet 2
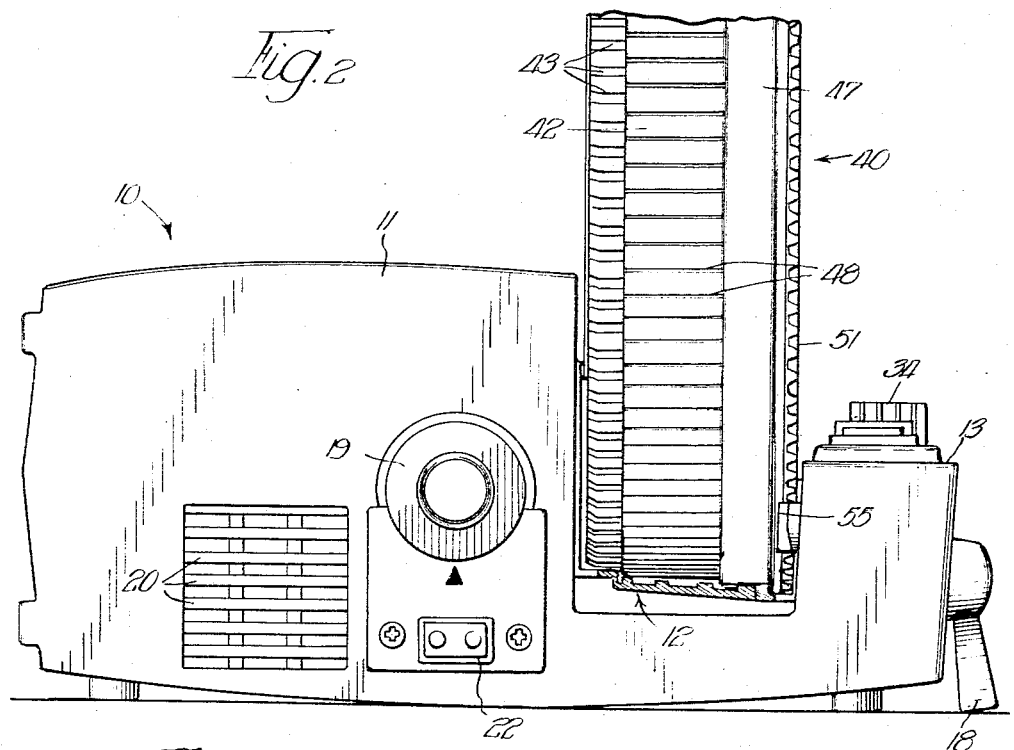
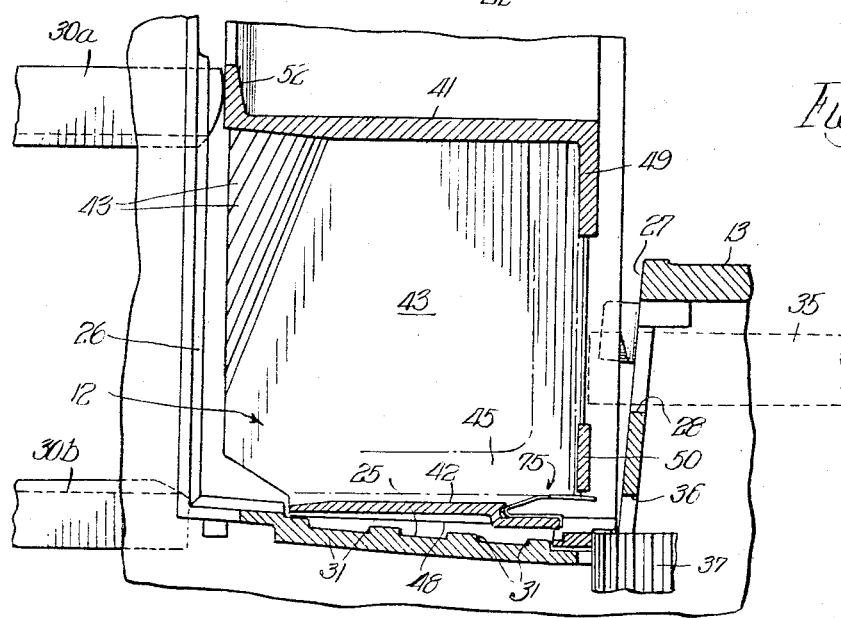
INVENTOR.
Walter J. Hall,
BY
Greist, Lockwood, Greenawalt & Dewey
ATTYS Nov. 21, 1967  W. J. HALL  3,353,667
SLIDE TRAY
Original Filed March 1, 1963  5 Sheets-Sheet 3
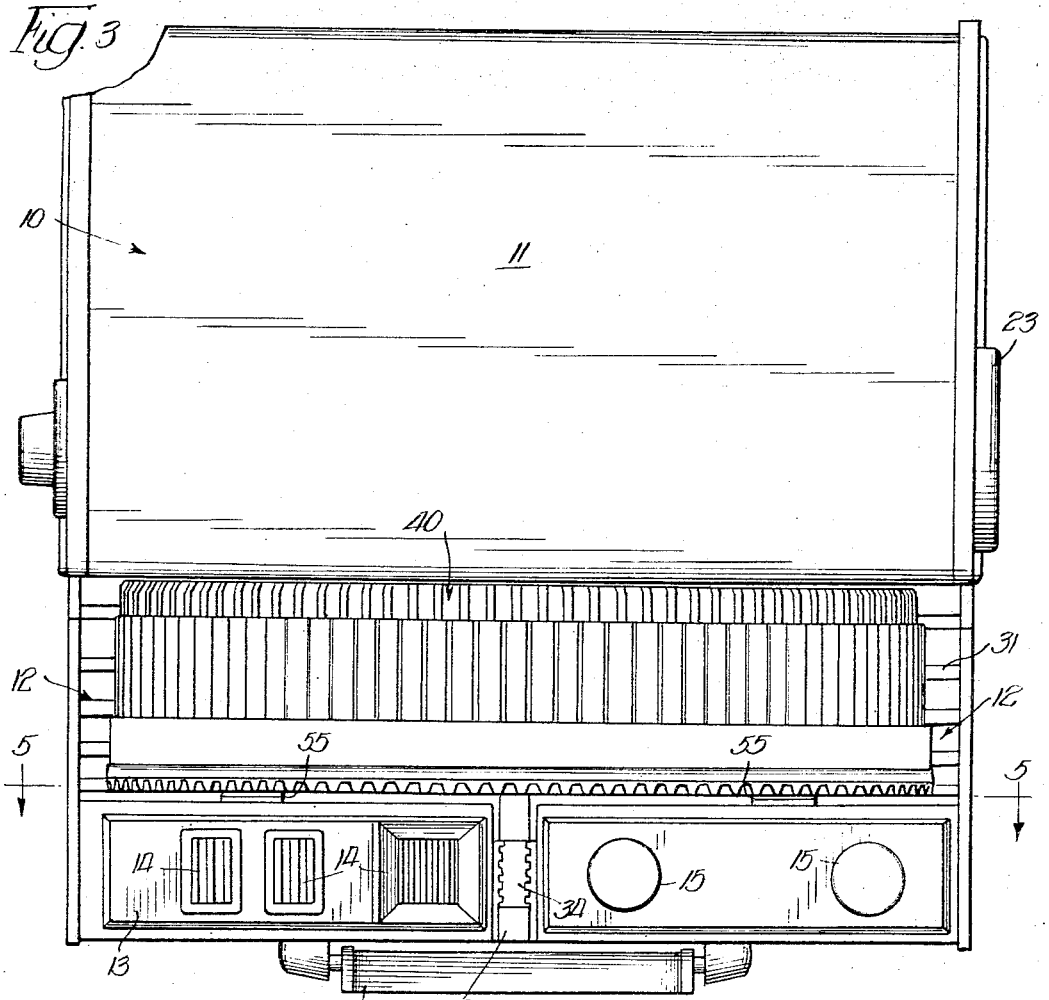
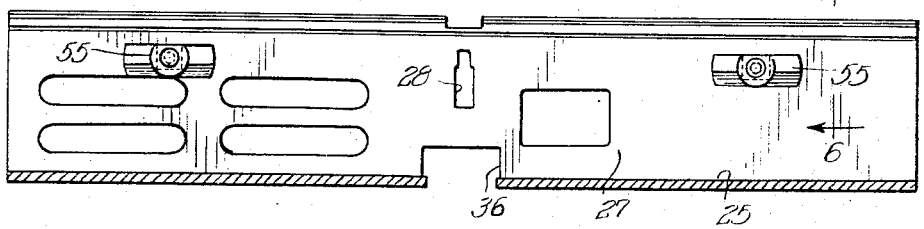
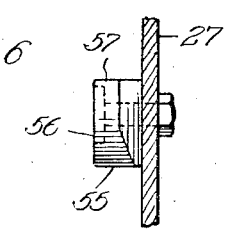
INVENTOR.
Walter J. Hall,
BY
Greist, Lockwood, Greenawalt & Dewey
Attys

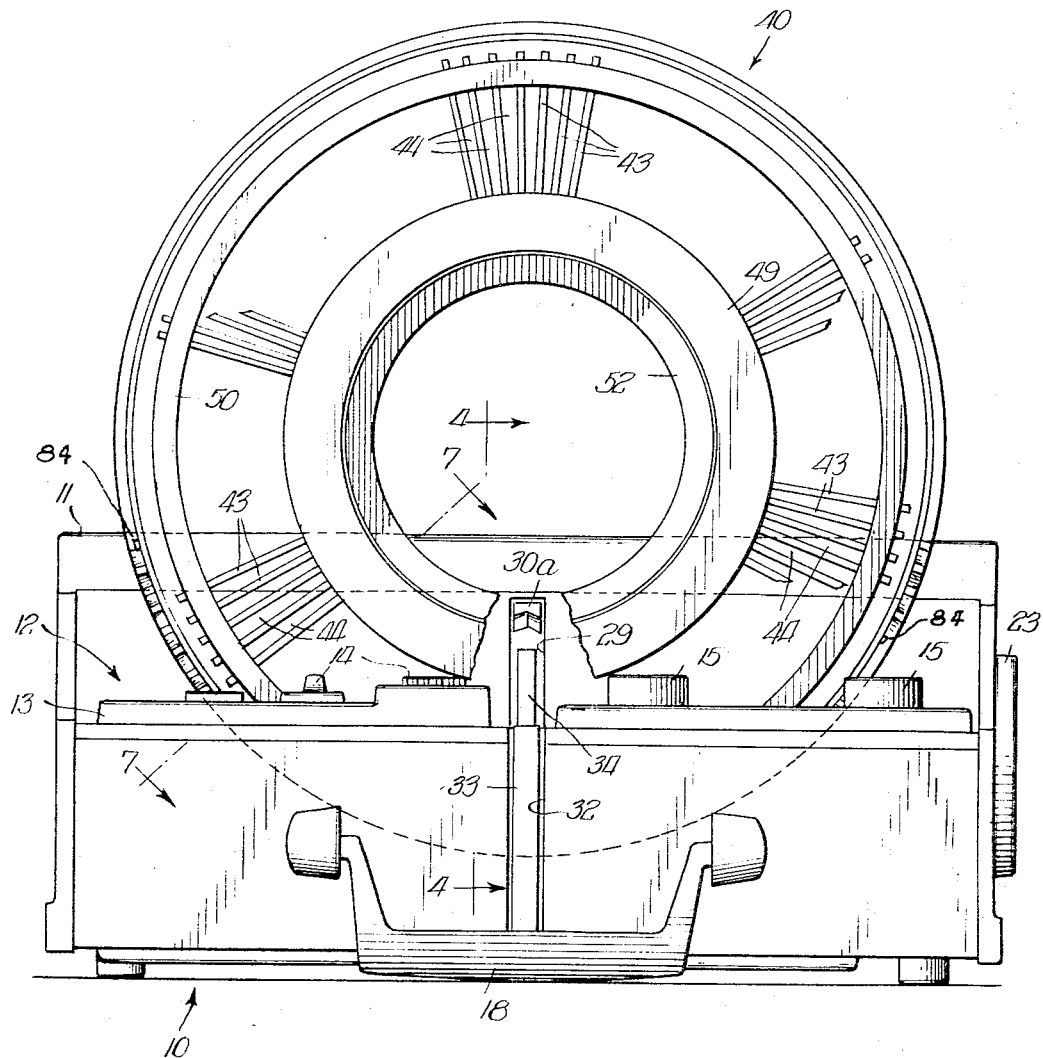

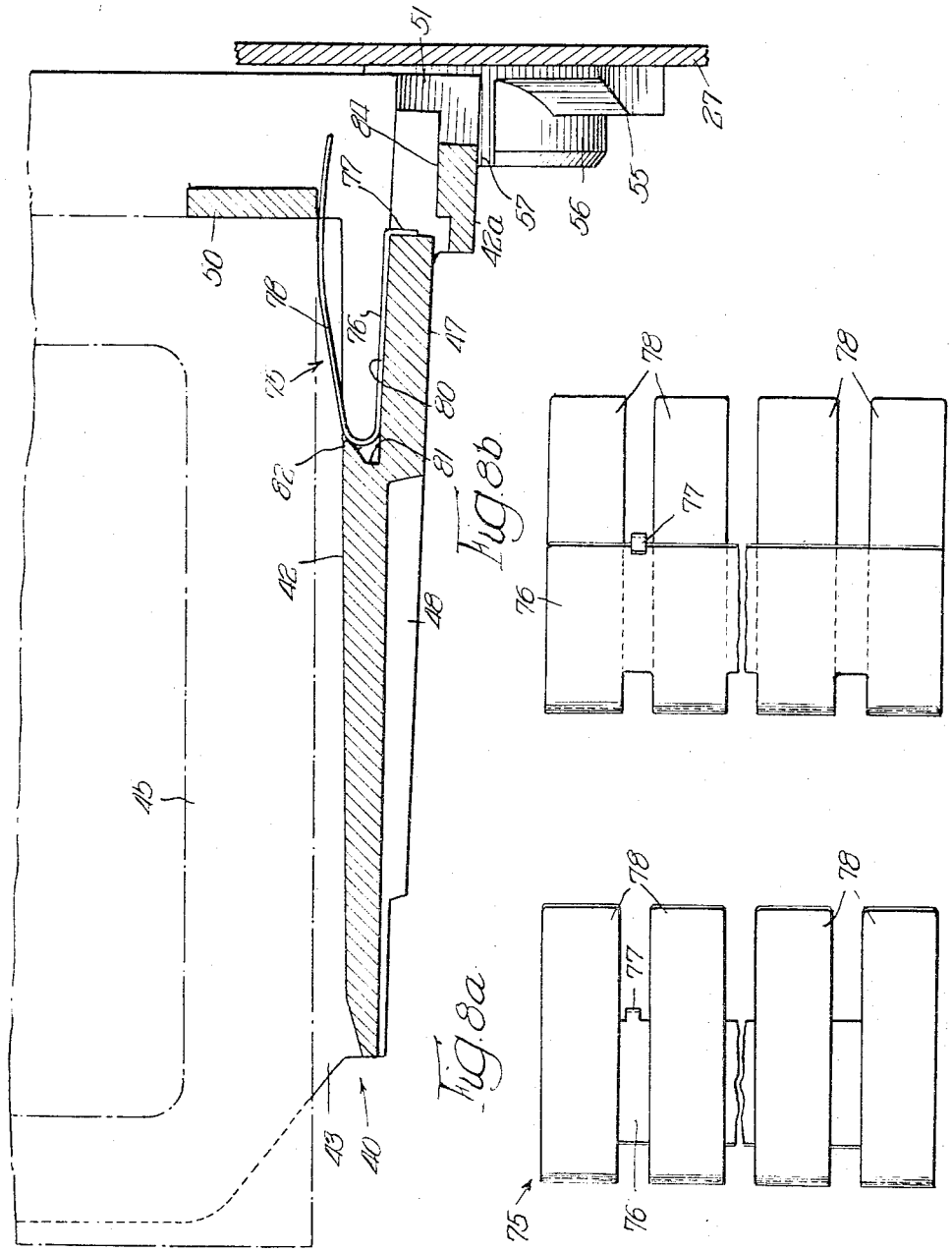

INVENTOR.
Walter J. Hall,
BY

United States Patent Office 3,353,667
Patented Nov. 21, 1967

3,353,667
SLIDE TRAY
Walter J. Hall, Chicago, Ill., assignor, by mesne assignments, to General Aniline & Film Corporation, New York, N.Y., a corporation of Delaware
Original application Mar. 1, 1963, Ser. No. 262,098, now Patent No. 3,209,647, dated Oct. 5, 1965. Divided and this application May 3, 1965, Ser. No. 461,574
4 Claims. (Cl. 206—73)

This invention relates, generally, to innovations and improvements in photographic slide projectors, and more particularly to a slide projector adapted to have either a conventional, elongated box-like, slide magazine or tray or a circular slide tray operatively associated therewith. This application is a division of my application Ser. No. 262,098, filed Mar. 1, 1963, now U.S. Patent No. 3,209,-647, granted Oct. 5, 1965.

As it is known to those skilled in the art, photographic slide trays or magazines are provided in two basic forms: viz., a box-like slide tray adapted to be received in a slide projector for linear slide indexing movement, or a circular slide tray adapted to be received in a slide projector for rotary slide indexing movement. Circular slide trays may be of the type adapted to rotate in either a vertical or horizontal plane. Heretofore, slide projectors have been incapable of accepting and operating with linear and/or rotary slide trays with equal facility.

It is a primary object of this invention to provide a slide projector adapted to have either an elongated box-like slide tray or a circular slide tray operatively associated therewith.

It is another object of the present invention to provide in a slide projector of the type characterized by a housing having, on the exterior thereof, a longitudinally extending slide-tray-receiving groove or channel, means for alternately supporting an elongated box-like slide tray and a vertically disposed circular slide tray in said groove.

A further object of the present invention is to provide in a slide projector of the type characterized by a housing having, on the exterior thereof, a longitudinally extending slide-tray-receiving groove, means for operatively supporting a circular slide tray in said groove in a vertically extending position, which means include protruding means permanently affixed to the projector and shaped and spaced for non-interfering relationship with a box-like slide tray when the latter is operatively supported in the groove.

An even further object of the present invention is to provide a new and improved vertically extending circular slide tray adapted for operative rotation while supported at the periphery thereof and adapted to be stabilized by engagement of an annular hub track thereof with guide track means on a projector.

It is a still further object of the present invention to provide a circular slide tray having new and improved slide retaining means.

These and other objects and advantages of the invention will become apparent from the following specification wherein like numerals refer to similar parts throughout.

In the drawings:

FIG. 1 is an elevational view of a slide projector and circular slide tray illustrating this invention, with a portion of the slide tray being broken away for better illustration of the invention;

FIG. 2 is a rear elevational view of the slide projector and circular slide tray of FIG. 1;

FIG. 3 is a top plan view of the slide projector and circular slide tray of FIG. 1;

FIG. 4 is an enlarged fragmentary section taken along the line 4—4 of FIG. 1;

FIG. 5 is a fragmentary section taken along the line 5—5 of FIG. 3 with certain parts of the projector not being shown for better illustration of the invention;

FIG. 6 is an enlarged fragmentary section taken along the line 6—6 of FIG. 5;

FIG. 7 is an enlarged fragmentary section taken along the line 7—7 of FIG. 1 showing the circular slide tray engaging protruding means mounted in the slide-tray-receiving groove of the projector, with certain parts of the projector not being shown;

FIG. 8a is a fragmentary plan view of one of the spring clip retainer members of the circular slide tray of this invention, the retainer being shown before the same is bent in arcuate form along the length thereof;

FIG. 8b is a view similar to FIG. 8a showing the other side of one of the spring clip retainer members;

Figure 9:
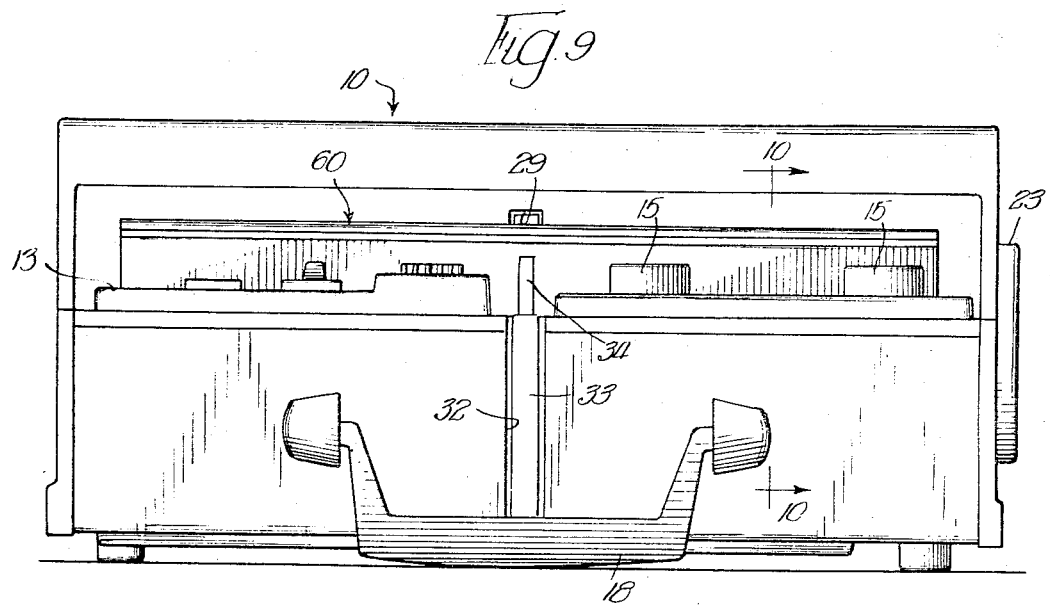
FIG. 9 is a side elevational view of the slide projector of FIG. 1 having a box-like slide tray operably associated therewith.

FIGS. 1 through 3 show a photographic slide projector, generally designated 10, which projector includes a housing or casing 11 having a longitudinally extending slide-tray-receiving groove, generally designated 12, formed in the exterior thereof. A control panel portion 13 having a number of suitable control buttons 14 and control knobs 15 operably mounted thereon extends along one side of the projector. The projector also includes a carrying handle 18, a snap-on cover (not shown), an on-off-lamp switch 19 (FIG. 2) and louvers 20 through which air may be drawn for cooling the optical system of the slide projector. The casing has an electric socket 22 recessed therein adapted to receive a conventional male plug on the end of an electric cord for applying electric power to the slide projector. The operating components of the slide projector will not be described as they form no part of the present invention. However, it will be understood that the slide projector 10 contains suitable components including a blower, lamp, reflector, and lenses for projecting photographic slides (e.g. 35 mm. slides) through an objective lens supported in an adjustable housing 23 (FIG. 3), which housing is suitably mounted for axial movement within the casing. By way of reference the inner mechanism of the projector may correspond to that shown and disclosed in Brown application, Ser. No. 824,877, filed July 3, 1959, now U.S. Patent No. 3,120,150, granted Feb. 4, 1964.

As best seen in FIGS. 2 and 4, the slide-tray-receiving groove 12 includes a base or floor 25 and side walls 26 and 27, the latter wall containing an aperture 28 (FIG. 5) at the mid-point thereof. Side wall 26 includes a vertically extending slide-receiving slot 29 at the mid-point thereof, which slot exposes slide receiving means in the form of parallel, horizontally extending upper and lower guide tracks 30a and 30b, respectively. The guide tracks extend at right angles to the groove 12, and the tip of upper guide track 30a extends a short distance through slot 29 into the groove 12. Floor 25 is provided with a plurality of parallel, spaced apart, longitudinally extending ribs 31 for supporting a slide tray in groove 12; the function of ribs 31 will be more fully explained below.

The control panel portion 13 of the slide projector includes a transversely extending recess 32 (FIG. 1) in which is slidably mounted a suitable slide carrier 33 having a handle 34 extending upwardly therefrom. The slide carrier includes a pusher bar 35 (FIG. 4) adapted to extend through aperture 28 in wall 27. It will be understood that the slide carrier is adapted for reciprocal movement in recess 32 for pushing photographic slides by the bar 35 from a slide tray adapted to be received in groove 12 into slot 29 and for returning slides from the slot to the slide tray. Flipper or kicker means (not shown) are provided with the slide carrier for returning a slide to the slide tray.

As seen in FIG. 4, the slide-tray-receiving groove 12 includes an opening 36 in opposed alignment with the slot 29, which opening is formed at the intersection between base 25 and side wall 27. A tray driving pinion 37 operatively associated with the slide carriage 33 and adapted for rotation about a vertical axis has a toothed portion thereof extending through opening 36 and into the groove 12. As will be more fully explained below in connection with the description of the slide trays adapted to be associated with the projector 10, the pinion 37 is adapted to index or rotate in response to movement of slide carriage 33 for indexing of a slide tray received in groove 12.

The circular slide tray of this invention, generally designated 40, will be seen from FIGS. 1 through 3 to be of the vertically disposed type including inner and outer concentric walls 41 and 42, respectively, having a plurality of radially disposed circumferentially spaced partitions or septums 43 extending therebetween. The partitions 43 are closely spaced apart defining a plurality of radially arranged slide receiving spaces or compartments in the circular slide tray. It will be understood that a conventional photographic slide (e.g. 35 mm. transparency mounted in a cardboard slide mount), fragmentarily shown by phantom lines and indicated 45 in FIG. 4, is adapted to be received in each of the slide receiving spaces 44 for movement axially of the circular slide tray into the slot 29 of the projector 10 when the slide tray is operatively supported within the groove 12. The circular slide tray 40 is further characterized by an annular band portion 47 and a plurality of circumferentially spaced apart axially extending ribs 48 formed on the outer surface of the outer wall 42. The circular slide tray, which is preferably molded from a suitable plastic material, includes an outer vertical face characterized by an outwardly extending annular hub flange 49 integral with the inner wall 41, an annular ring 50 secured to each of the partitions 43 and an annular rack formation of teeth 51. The circular slide tray includes an inner face characterized by an inwardly extending annular hub flange 52 integral with the inner wall 41.

The circular slide tray 40 is adapted to be operatively received in vertically extending disposition in the longitudinally extending slide-tray-receiving groove 12 with one of the slide-receiving spaces 44 in alignment with the slide-receiving slot 29. In other words, the circular slide tray of this invention is mounted for rotation about its principal axis, i.e., its central longitudinal axis, which axis is parallel to a transverse axis extending through slot 29. As best seen in FIG. 4, when the slide tray 40 is received in groove 12 one of the ribs 48 of the slide tray engages the innermost rib 31 on the base 25 of the groove for establishing a support point between the slide tray and groove. With the circular slide tray 40 in this disposition in groove 12, certain teeth 51 on the slide tray are in meshing engagement with certain teeth of gear 37. Rotation or indexing of gear 37 in response to movement of slide carrier 33 indexes the circular slide tray for positioning one of the adjacent slide receiving spaces 44 in alignment with slot 29, depending upon the direction the pinion gear 37 is driven. However, the circular slide tray 40 is not supported by engagement of teeth 51 and the teeth on gear 37. In addition to the support for the circular slide tray established by transverse engagement of one of the ribs 48 with the innermost rib 31, further means are provided for slidably engaging the periphery of the slide tray adjacent the outer face thereof for operatively supporting the slide tray in the groove 12 and preventing the same from rolling from the groove.

As seen in FIGS. 5, 6 and 7, this means is in the form of a pair of lugs or protruding inserts 55, which lugs are bolted or riveted to the side wall 27 of the slide-tray-receiving groove 12 one on each side of the aperture 28. Each lug 55 includes a central rounded hub portion 56 having a flattened top 57. As seen in FIGS. 5 and 7, the lugs 55 are mounted on the side wall 27 for engaging the periphery of the circular slide tray at points on the rounded hub portions 56 just inwardly of the flat portions 57. The protruding inserts or lugs are located on side wall 27 for slidably engaging the periphery of the circular slide tray when the same is operatively positioned in groove 12 with one of the tray spaces 44 in alignment with slot 29. The circular slide tray includes an outer annular rim portion 42a (FIG. 7) adapted for slidable engagement with the hub portions 56 of the lugs.

From the foregoing it is believed to be apparent that the circular slide tray 40 is supported in groove 12 in vertically extending disposition by being contacted at three points on the periphery thereof. One point of contact is established at the periphery of the tray adjacent the inner face thereof by engagement of one of the ribs 48 with the innermost rib 31 of the base 25. The other two points of contact at the periphery of the tray are adjacent the outer face thereof and are established by contact of the annular band portion 42a with the protruding inserts 55. The inserts or lugs 55 are spaced one forwardly and one rearwardly of the principal axis of tray 40 for engaging the periphery of the tray at spaced apart points forwardly and rearwardly of this axis. The lugs position and support the tray for selective alignment of spaces 44 therein with the slot 29 by engagement of the teeth on gear 37 with the teeth 51 on the tray, and the lugs also prevent the circular slide tray from rolling from groove 12. It will be apparent that tray 40 is removably supported in groove 12 and adapted for operable rotation therein by sliding engagement of the peripheral portions of the tray with the protruding inserts 55 and one of the ribs 31. In the preferred form of the invention the slide tray ribs 48 are shown as adapted to engage only one rib 31, i.e., the innermost rib, on the base or floor portion of the groove 12. This single point contact between the periphery of the tray and the groove 12 is not critical. The cross-section of the tray 40 or groove 12 or both may be appropriately varied for allowing ribs 48 to engage other of the ribs 31 in the groove. In this case the other ribs will serve to support the tray so that the teeth 51 thereon will be in mating alignment with the teeth on gear 37, and in this case the lugs 55 function only for aligning the spaces 44 with slot 29 and for preventing the circular slide tray from rolling in the groove 12.

As noted in FIG. 4, the upper guide track 30a projecting through slot 29 in the projector casing is in alignment with an annular planar surface defined by the outside surface of the annular inner hub flange 52 (FIG. 4). During rotation of circular slide tray 40 by gear 37 annular flange 52 intermittently abuts or slides against the end of upper guide track 30a. If the projector is tilted slightly to the side away from the control panel portion 13, the flange 52 will rest continuously against the protruding end of the track 30a. This action serves to stabilize support of slide tray 40 in groove 12.

Figure 10:
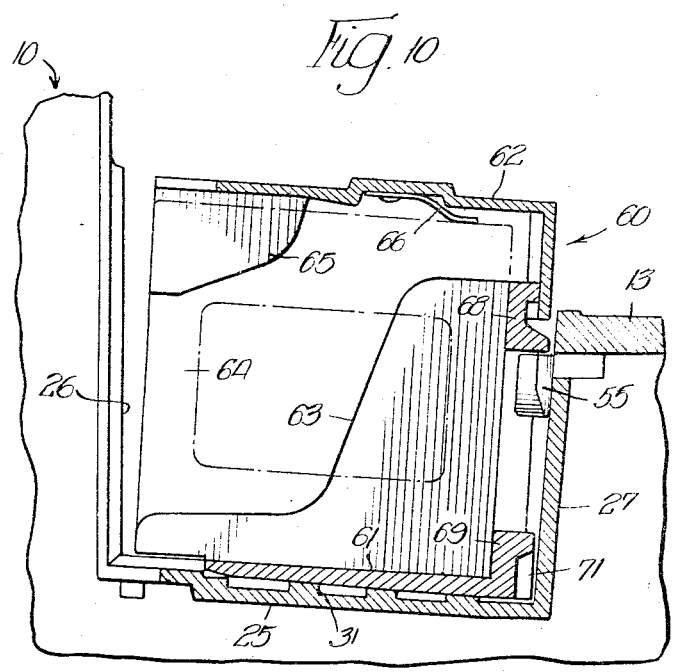
FIG. 10 is a section taken along the line 10—10 of FIG. 9.

FIGS. 9 and 10 show the slide projector 10 having a box-like slide tray, generally designated 60, operatively supported in the slide-tray-receiving groove 12. The slide tray 60, which may be of the type disclosed in the Brown application, Ser. No. 824,877, filed July 3, 1959, includes a base portion having a floor or bottom 61 adapted for sliding engagement with the ribs 31 provided on the base 25 of the groove 12. The slide tray 60 further includes a cover 62 adapted to be removably or hingedly attached to the base portion of the slide tray. The base portion of the slide tray includes end walls (not shown) and a plurality of parallel partitions 63 evenly spaced apart between the end walls. The partitions 63 define a plurality of slide receiving spaces for receiving conventional photographic slides, one of which slides is shown in phantom lines and indicated 64 in FIG. 10. The cover 62 includes a plurality of depending ribs 65 adapted for respective alignment with partitions 63 for further defining the slide receiving spaces in the slide tray 60. The cover 62 also includes a plurality of spring clips 66 attached to the underside thereof, which spring clips are adapted to engage the upper edges of the slides for securely holding the same in place in the slide tray. The outer face of slide tray 60, i.e., the face adjacent groove side wall 27, includes a longitudinally extending opening defined by upper and lower base portions 68, 69 respectively. This open space on the outer face of slide tray 60 allows pusher bar 35 associated with slide carrier 33 to engage the outside edge of one of the slides supported in the slide tray for pushing the slide into slot 29 of the slide projector housing. Lower base portion 69 is provided with a rack of teeth 71 extending along the length thereof, which teeth are adapted to mesh with the teeth on driving pinion 37 for indexing of slide tray 60 by pinion 37. As it will be noted from FIG. 10, the protruding inserts or lugs 55 are located on side wall 27 for non-interfering relation with slide tray 60. More particularly, the flattened portions 57 of the lugs 55 clear the bottom of base portion 68 when slide tray 60 is operatively positioned in groove 12. By this construction it will be apparent that lugs 55, which are located in groove 12 for support of the circular slide tray 40, in no way interfere with the operation of slide tray 60 when the latter is operatively associated with the slide projector. A number of other commercially available, linear or straight slide trays may be used in the groove 12.

It is desirable to provide the circular slide tray 40 with means for preventing photographic slides from falling from the slide receiving spaces therein if the tray is inadvertently tipped during handling of the same. The circular slide tray 40 includes such means in the form of a plurality of detachable spring clip retainers, generally designated 75, which retainers are illustrated in FIGS. 7 and 8. The retainer 75 is generally U-shaped in cross-section and includes a first leg 76 having at least one lug 77 extending at a right angle from one edge thereof (FIGS. 8a and 8b). The other leg of retainer 75 is in the form of a plurality of parallel, spaced-apart spring fingers 78.

(As seen in FIG. 7, outer wall 42 of the circular slide tray includes adjacent the outer face thereof an annular portion 80 of greater inside diameter than the inside diameter of the major portion of the outer wall.) This portion of the outer wall 42 is separated from the major portion of this wall by an annular shoulder 81, which should is undercut defining an annular lip 82. The annular portion 80 of outer wall 42 includes a plurality of circumferentially spaced-apart, axially extending grooves 84 in the inner surface thereof. The grooves 84 open at one end thereof into teeth 51 on the outer face of the circular slide tray (FIGS. 1 and 7). The spring clip retainer 75 is adapted to be detachably received in the circular slide tray by bending the retainer in arcuate form along the length thereof and by inserting the same between annular ring 50 and annular portion 80. The retainer 75 is pushed into the slide tray (to the left as seen in FIG. 7) until the bight portion of the retainer engages shoulder 81. Axially extending groove 84 is adapted to receive lug 77 as the spring retainer is forced inwardly in the circular slide tray. Engagement of lug 77 in groove 84 aids in detachably securing the retainer in place in the circular slide tray and prevents movement of the retainer along the length thereof relative to the circular slide tray. A single retainer 75 of sufficient length may be provided for extending completely around annular portion 80. In the preferred form of the invention a number of retainers 75 are provided, which retainers are adapted to be bent in arcuate form and mounted in end-to-end relationship in annular portion 80. It will be understood that the retainer or retainers 75 are circumferentially located in the slide tray by engagement of lugs 77 in grooves 84 so that a spring finger 78 is in alignment with each of the slide receiving spaces 44. As noted in FIG. 7, each spring 78 is adapted to engage the inner edge of one of the photographic slides 45 for holding the latter in place in the circular slide tray. The spring fingers prevent inadvertent separation of the slides from the circular slide tray but permit the sides to be easily pushed from the slide receiving spaces or returned thereto by the slide carriage.

Thus it will be seen that this invention provides in a slide projector of the type characterized by a housing having a longitudinally extending slide-tray-receiving groove, means for alternately supporting an elongated box-like slide tray and a circular slide tray in the groove. The protruding inserts or lugs provided in the longitudinally extending groove in the projector for operably supporting the circular slide tray therein do not in any way interfere with the operation of a box-like slide tray when the latter is operatively positioned in the groove. It will be realized that it is within the scope of this invention to provide the protruding inserts in other forms or to provide the protruding inserts as an integral part of the side walls defining the groove. In the preferred form of the invention the inserts or lugs 55 as well as the end of guide track 30a are made of a hard and smooth material, such as nylon, to minimize friction between these parts and the periphery of the tray.

It will be realized that this invention provides novel slide projecting means wherein a circular slide tray, elongated box-like slide tray and means on the projector for operatively supporting these trays may be manufactured with ease and at a low cost. Exact tolerances need not be adhered to in the construction of the trays or in the shape of the slide-tray receiving groove in the projector as the circular slide tray 40 will be operatively supported in groove 12 in vertically extending disposition as long as any three contact or support points are established between the periphery of the tray and the surface of groove 12. As mentioned above, in the preferred embodiment of the invention the three support points are defined by the two protruding inserts or lugs 55 and the innermost rib 31 of base 25. However, in certain instances, e.g., if tray 40 is slightly wider than usual or if guide track 30a extends more than the usual distance into groove 12, circular slide tray 40 may be operatively supported only by engagement of the periphery thereof with both lugs 55 and with the tip of upper guide track 30a. In some instances circular slide tray 40 may be supported by engaging the tip of upper guide track 30a, the pinion gear 37 and one or both of the inserts 55. The circular slide tray is of light weight and symmetrical construction and almost any three point contact between its periphery and groove 12 will serve to support tray 40 operatively in groove 12.

While the invention has been shown in but one form it will be obvious to those skilled in the art that it is not to be so limited, but on the contrary it is susceptible of various changes and modifications without departing from the spirit and scope of the appended claims.

I claim:

1. In a circular slide tray, the construction comprising, inner and outer concentric walls having a plurality of radially disposed circumferentially spaced partitions arranged therebetween, said partitions defining therebetween a plurality of axially extending slide receiving spaces, said outer wall having a first inner face portion thereof of greater inside diameter than the inside diameter of the remaining inner face portion of the outer wall, said portions being separated by an annular shoulder, the edge portions of said partitions adjacent said first inner face portion being in uniform spaced relation with the latter thereby defining an annular space, an annular planar member extending in uniform, closed spaced relation with the edge of said outer wall adjacent said first portion thereof, said planar member having an edge thereof extending in adjacent relation with the inner confines of said annular space, annular spring clip retaining means mounted in said annular space, said retaining means being generally U-shaped in cross-section and having the bight portion thereof in engagement with said shoulder with one leg of the retaining means being in substantial coextensive contact with said first inner face portion and with the other leg of said retaining means consisting of a plurality of individual spring fingers, said spring fingers normally yieldably engaging fixed means adjacent the inner confines of said annular space and being arranged in respective slide receiving spaces for resilient engagement with the edges of slides received therein.

2. The construction according to claim 1 further defined by, said outer wall having a plurality of recesses opening into said first inner face portion thereof, said retaining means including a plurality of lugs formed on said one leg thereof, which lugs are received in respective recesses for aiding in securing the retaining means in said annular space.

3. A tray for photographic slides comprising, a pair of uniformly spaced walls having spaced partitions therebetween defining a plurality of slide receiving spaces, said magazine having an open inner face between said walls for entry of slides into said spaces and for exit of slides therefrom, said magazine having an outer face defined in part by a planar member extending in uniform spaced relation with the adjacent edge of one of said walls thereby defining with said edge a narrow slot opening at said outer face and also opening into each of said slide receiving spaces, a portion of said one wall adjacent said edge thereof being in opposed spaced relation with corresponding edge portions of said partitions thereby defining an annular space communicating with said slot, spring clip retainer means of generally U-shape cross-section, said retainer means being substantially contained within said annular spce with the distal end portions of the former being disposed adjacent said slot, which retainer means has one leg portion thereof in substantial coextensive contact with the inside face of said portion of said one wall and has its other leg portion in pressing engagement with fixed means adjacent the inner confines of said annular space, said other leg portion being in the form of a plurality of spring fingers one extending into each of said slide receiving spaces for retaining slides therein.

4. The tray according to claim 1 wherein said retainer means and said one wall have respective lugs and recesses with the former being received in the latter.

References Cited

UNITED STATES PATENTS

| | | | |
|---|---|---|---|
| 326,493 | 9/1885 | Goldsmith | 312—295 XR |
| 2,278,295 | 3/1942 | Wilson | 206—62 XR |
| 2,900,074 | 8/1959 | Windman | 206—73 X |
| 3,045,816 | 7/1962 | King | 206—73 |
| 3,120,150 | 2/1964 | Brown | 206—62 XR |
| 3,159,934 | 12/1964 | Wiklund | 206—73 XR |
| 3,187,890 | 6/1965 | Brown | 206—73 |

THERON E. CONDON, *Primary Examiner.*

J. M. CASKIE, *Assistant Examiner.*

UNITED STATES PATENT OFFICE
CERTIFICATE OF CORRECTION

Patent No. 3,353,667

November 21, 1967

Walter J. Hall

It is hereby certified that error appears in the above numbered patent requiring correction and that the said Letters Patent should read as corrected below.

Column 5, line 55, for "should" read -- shoulder --; column 7, line 30, for "thereform" read -- therefrom --; column 8, line 8, for "spce" read -- space --; line 17, for the claim reference numeral "1" read -- 3 --.

Signed and sealed this 27th day of May 1969.

(SEAL)
Attest:

Edward M. Fletcher, Jr.
Attesting Officer

Commissioner of Patents